No. 777,458. PATENTED DEC. 13, 1904.
H. W. WARREN.
CHECK ROW CHAIN.
APPLICATION FILED JUNE 1, 1904.
NO MODEL.

Witnesses

Inventor
Herman W. Warren
By Victor J. Evans
Attorney

No. 777,458.

Patented December 13, 1904.

UNITED STATES PATENT OFFICE.

HERMAN W. WARREN, OF SHERIDAN, ILLINOIS.

CHECK-ROW CHAIN.

SPECIFICATION forming part of Letters Patent No. 777,458, dated December 13, 1904.

Application filed June 1, 1904. Serial No. 210,706. (No model.)

*To all whom it may concern:*

Be it known that I, HERMAN W. WARREN, a citizen of the United States, residing at Sheridan, in the county of Lasalle and State of Illinois, have invented new and useful Improvements in Check-Row Chains, of which the following is a specification.

This invention relates to a novel attachment for check-row wires by means of which device such a wire may be stretched across a field and anchored regardless of the position of the buttons on the wire.

When planting corn in a fenced field of irregular shape by means of a check-row planter, the check-row wire cannot always be anchored in the field being planted, as the securing means are connected to one of the buttons on the wire. The wire must therefore be passed through the fence before it can be anchored. This is often a troublesome and inconvenient operation and much disliked by farmers. It is to overcome this difficulty that my invention pertains; and it consists in a certain novel construction and arrangement of parts hereinafter described and claimed.

Figure 1:
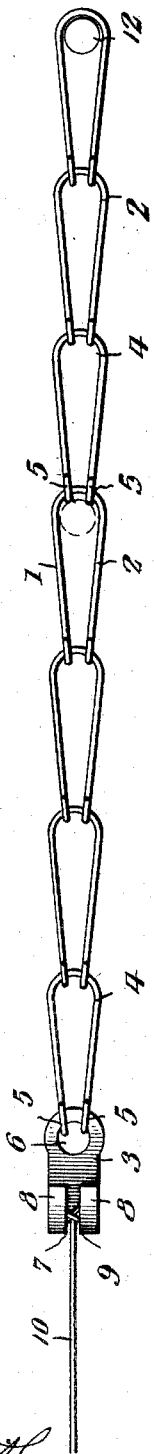
Figure 2:
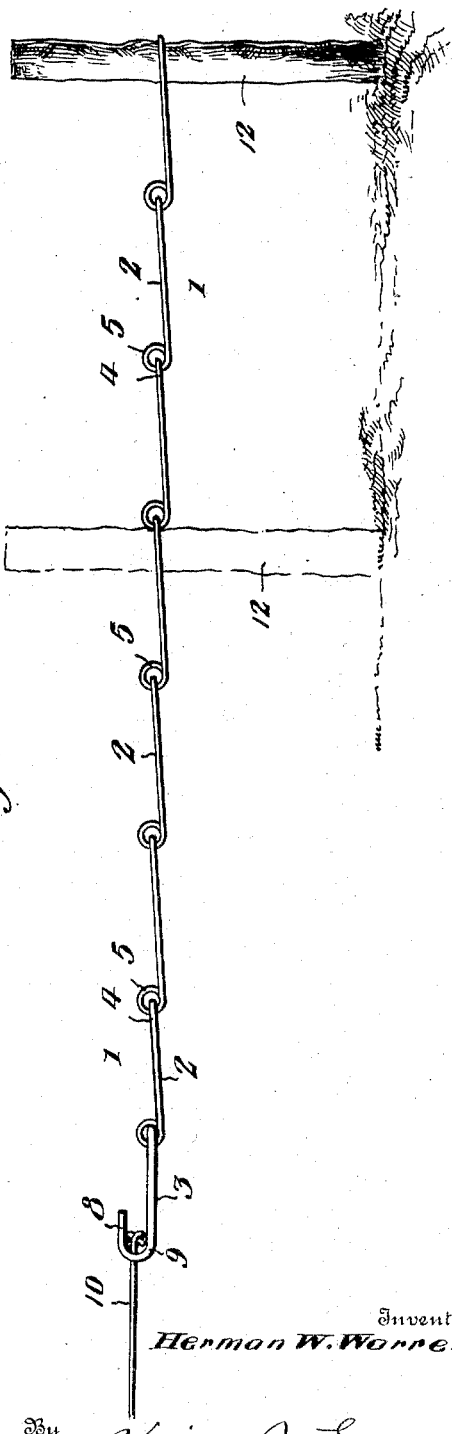

In the accompanying drawings, Figure 1 is a top plan view of my attachment in operative position. Fig. 2 represents an elevation of the same.

The chain as a whole (indicated by 1) is composed of a series of connected links 2, having a hook 3 fastened to one end. Each link is made of a length of wire bent at its middle to form a semicircular loop 4, through which an anchor-stake 12 may easily pass. The ends 5 of the wire are then turned around the looped end 4 of the succeeding link. The hook 3 has an eye 6 at one end for the turned ends 5 of the last link in the chain. The other end of the hook, bent as shown, is centrally slotted at 7 to form two prongs 8, which engage a button 9 on the check-row wire 10, which latter passes through the slot 7, as shown.

To use the attachment, assuming that one end of the check-row wire is anchored at one side of the field, the wire is tightened and the hook 3 connected to a button on the check-row wire no farther from the fence or edge of the field than the length of the chain. The wire and chain are then drawn taut and an anchor-stake 12 slipped through the loop 4 of the link 2 most convenient and driven into the ground. Should the width of the field as planting proceeds increase or decrease, the hook may be connected to another button or the anchor-stake engage a new link.

While I have described in detail a particular style of chain, it is to be understood that I do not limit myself to that form. A chain of any construction may be substituted, provided an opening is formed in one end of each link for the reception of the anchor-stake.

This attachment may be easily carried in the pocket, as it is light, strong, and cheap, and from practical experience of great convenience, effecting a saving both in time and trouble when changing the check-row wire and setting the anchor. This attachment may be used at either end of the check-wire when desired.

Having thus described the invention, what is claimed as new and useful is—

1. A check-row-wire attachment comprising a chain formed of elongated links, each link having an opening for an anchor-stake, and a hook at one end of said chain.

2. A check-row-wire attachment, comprising a chain formed of elongated links, each link having a loop at one end for an anchor-stake, and its opposite end connected to the following loop, and a hook on one end of said chain having prongs adapted to engage a button on a check-row wire.

In testimony whereof I affix my signature in presence of two witnesses.

HERMAN W. WARREN.

Witnesses:
 M. A. HATHORN,
 AL. A. CLAPSADDLE.